United States Patent
Kasbergen et al.

(10) Patent No.: US 12,415,708 B2
(45) Date of Patent: Sep. 16, 2025

(54) STAIRLIFT SAFETY SYSTEM

(71) Applicant: TK Home Solutions B.V., Krimpen aan den IJssel (NL)

(72) Inventors: Paul Kasbergen, Capelle aan den IJssel (NL); Cornelis Boxum, Delfgauw (NL); Bert Blokzijl, Krimpen aan den IJssel (NL)

(73) Assignee: TK Home Solutions B.V., Krimpen aan den IJssel (NL)

( * ) Notice: Subject to any disclaimer, the term of this patent is extended or adjusted under 35 U.S.C. 154(b) by 381 days.

(21) Appl. No.: 17/998,867

(22) PCT Filed: May 28, 2021

(86) PCT No.: PCT/EP2021/064333
§ 371 (c)(1),
(2) Date: Nov. 15, 2022

(87) PCT Pub. No.: WO2021/239939
PCT Pub. Date: Dec. 2, 2021

(65) Prior Publication Data
US 2023/0192445 A1    Jun. 22, 2023

(30) Foreign Application Priority Data
May 29, 2020 (EP) .................. 20177442

(51) Int. Cl.
*B66B 9/08* (2006.01)
*H02P 3/06* (2006.01)

(52) U.S. Cl.
CPC . *B66B 9/08* (2013.01); *H02P 3/06* (2013.01)

(58) Field of Classification Search
CPC ..................... B66B 9/08; H02P 3/06
See application file for complete search history.

(56) References Cited

U.S. PATENT DOCUMENTS

| 5,476,155 A | 12/1995 | Nakatani et al. | |
| 6,679,353 B1* | 1/2004 | Muranaka ............. | B66B 9/08 |
| | | | 187/202 |
| 2013/0112505 A1* | 5/2013 | Zuercher ............... | B66B 9/04 |
| | | | 187/200 |

(Continued)

FOREIGN PATENT DOCUMENTS

| CN | 110902527 A | 3/2020 |
| JP | 2000026048 A | 1/2000 |
| WO | 2004/083093 A2 | 9/2004 |

OTHER PUBLICATIONS

International Search Report for International Application No. PCT/EP2021/064333, dated Aug. 9, 2021.

(Continued)

*Primary Examiner* — Thomas Ingram
(74) *Attorney, Agent, or Firm* — Dinsmore & Shohl LLP

(57) ABSTRACT

Disclosed is a safety system for a stairlift. The Safety system comprises a component for sending and receiving an electromagnetic signal that includes a light emitting device such as an LED and a light receiving device such as a photo resistor, an electromagnetic signal interrupter like a movable vane, a moveable activator, and a processor. The activator is configured to be moved by a user of the stairlift, which in turn causes the signal interrupter to interrupt a first electromagnetic signal.

10 Claims, 3 Drawing Sheets

(56) References Cited

U.S. PATENT DOCUMENTS

2015/0022133 A1\* 1/2015 Sauer ................... H02H 7/0852
                                                            318/473
2019/0089273 A1\* 3/2019 Kirby ........................ H02P 3/24
2019/0382243 A1\* 12/2019 Van Eijgen ............... B66B 9/08
2020/0207584 A1\* 7/2020 Chen ......................... B66B 9/08
2021/0078822 A1\* 3/2021 Nash ......................... B66B 9/00
2023/0027260 A1\* 1/2023 Hanaoka ................ B25J 9/1664

OTHER PUBLICATIONS

Extended European Search Report in priority application No. EP 20177442.9, dated Nov. 12, 2020.

\* cited by examiner

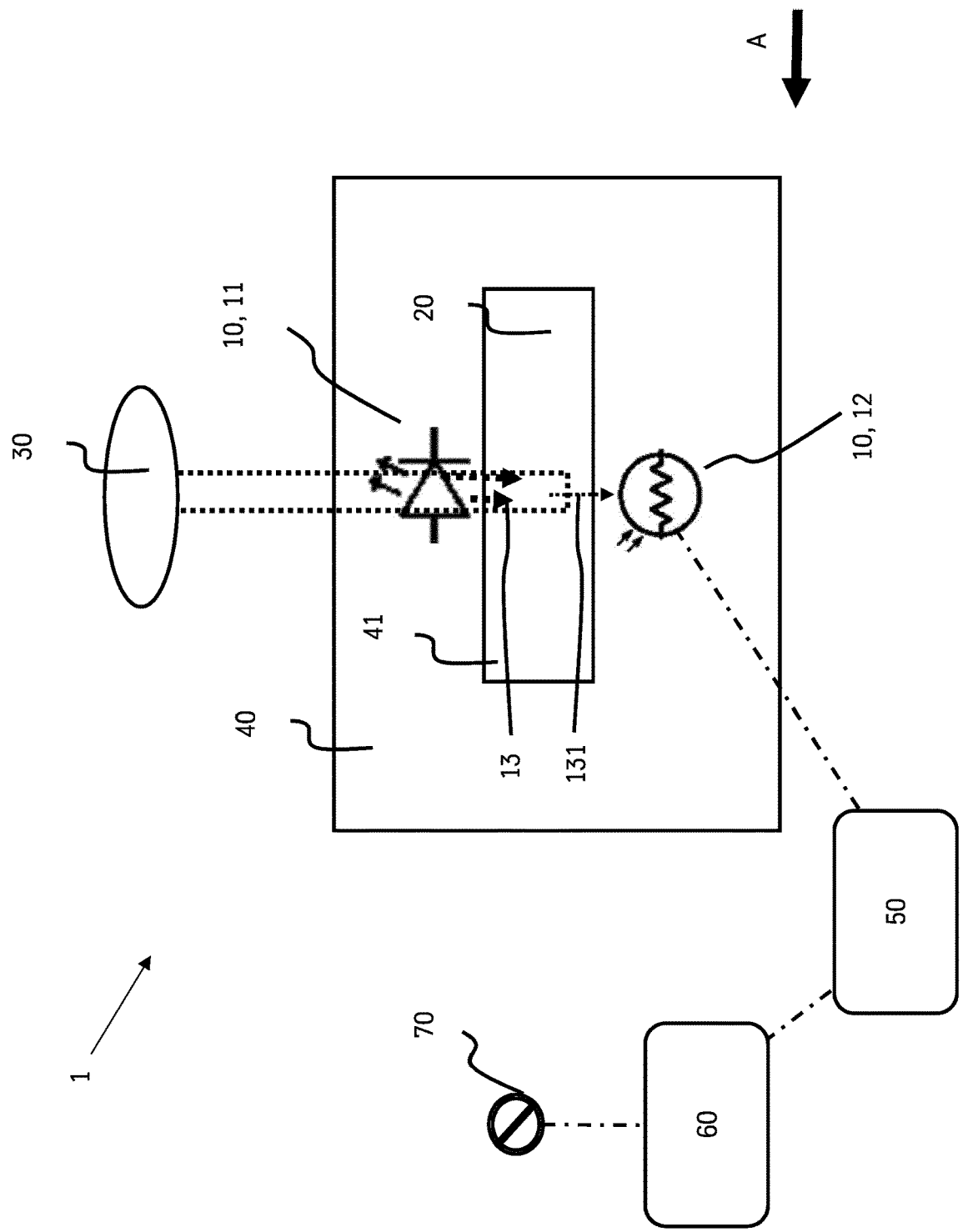

STAIRLIFT SAFETY SYSTEM

CROSS REFERENCE TO RELATED APPLICATIONS

This application is a U.S. National Stage Entry of International Patent Application Serial Number PCT/EP2021/064333, filed May 28, 2021, which claims priority to European Patent Application No. EP 20177442.9, filed May 29, 2020, the entire contents of each of which are incorporated herein by reference.

FIELD

The present disclosure generally relates to stairlift safety systems, and a method of operating a stairlift having a stairlift safety system.

BACKGROUND

A stairlift is a product which is typically meant for people with impaired mobility to provide support in travelling up and down a staircase whilst maintaining the functionality of the stairs for persons who are able to climb the stairs themselves. The stairlift is often installed in a person's home and typically comprises a drive unit that is arranged to drive a user carrier, e.g., a chair or a wheelchair platform, along a rail, mounted on or along one or more flights of a staircase.

An emergency stop function in a stairlift needs to be reliable and is usually embodied as a button, which is normally placed in the armrest just behind the joystick. A known way for an emergency stop button to function is by using a normally closed contact with direct opening characteristics, which means that the operating force is directly transferred to the electrical contact without having spring-loaded elements in-between. When the button is activated, it is required to maintain its activated state—this is known as "latching"—until the button is reset. The reset function needs to be accomplished in a way that any unintended reset action is prevented, e.g., pulling the button, rotating the button, or pushing a separate reset button. It is common for such a button to be bought directly "off the shelf". However, in certain cases, these "off the shelf" solutions are too big, or too expensive, or both to fit into the armrest of the stairlift.

WO 2004/083093 A2 relates to improvements in stairlifts, in particular, it relates to a hand-operated interface through which a stairlift user can control the operation of the stairlift. The interface is configured for comfortable reception in the palm of the hand and its position may be adjusted along the axis of the armrest of the stairlift chair to best suit the arm length of the user. The interface may also incorporate a power isolation switch which provides both a visual and a tactile indication of whether or not the stairlift controls are activated for use. In this application, the control interface is incorporated into a forward part of the armrest and its position can be adapted according to the preferred ergonomics of the user. It is pivotable about a substantially vertical axis and is shaped for comfortable receipt in the palm of a user.

However, the art fails to address the need of having an electronically latching system in a stairlift, in particular an emergency stop button, in particular in the armrest of a stairlift which can not only be easily controlled by a user but which is simple in terms of both its operation and installation, improves safety and is also suitable for any type of stairlift armrest.

Thus a need exists for a stairlift safety system having an electronic latching system adapted for the armrest of a stairlift, wherein said latching system is designed to prevent unintended use of the emergency stop function whilst also providing an emergency stop system that is simpler in its operation and has improved safety.

BRIEF DESCRIPTION OF THE FIGURES

FIG. 2 is a schematic diagram of the embodiment of a safety system of FIG. 1, showing the safety system in an "activated" state.

DETAILED DESCRIPTION

Figure 1:
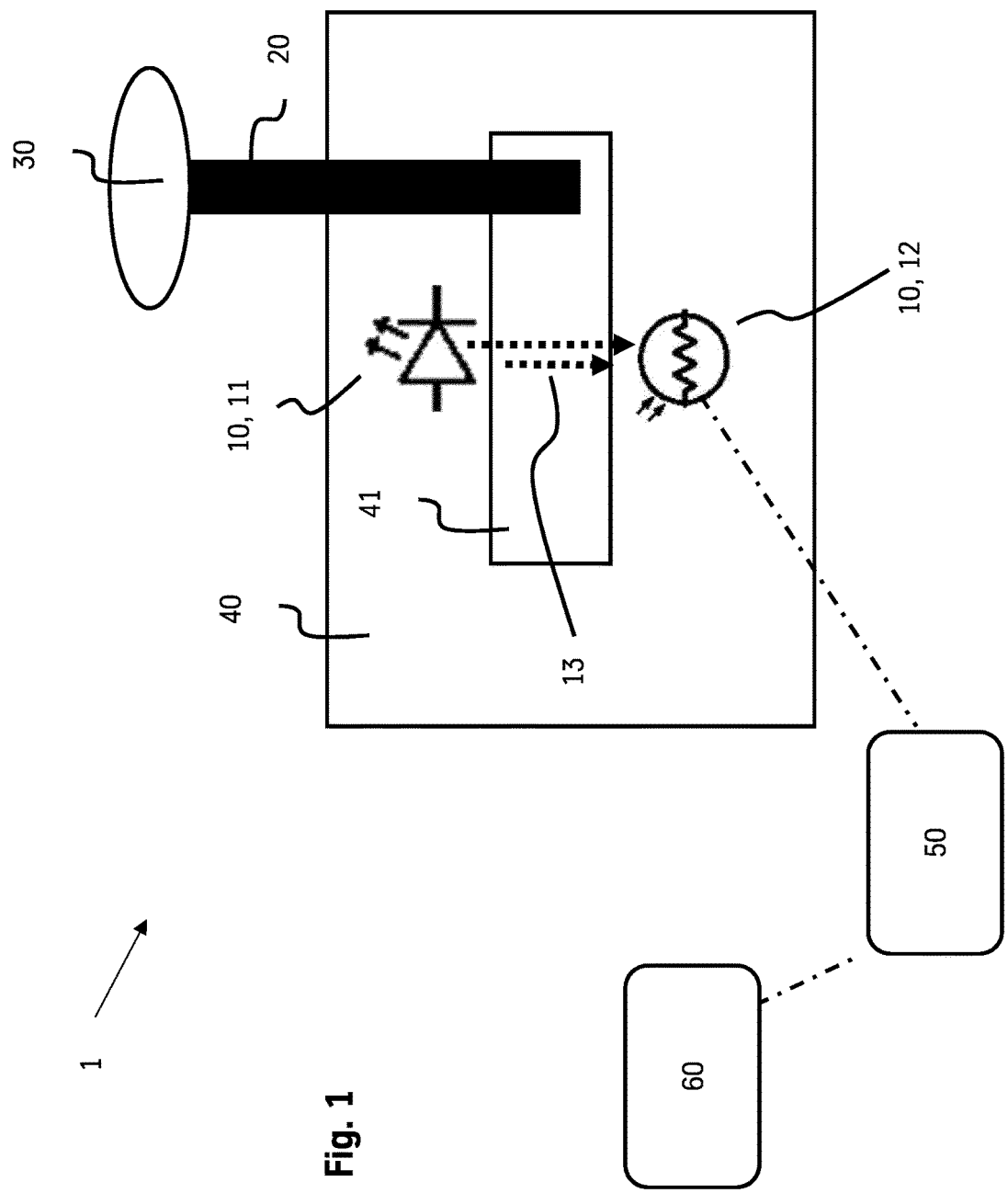
FIG. 1 is a schematic diagram of an embodiment of a safety system of the present disclosure, showing the safety system in a "non-activated" state.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a stairlift safety system and a method of controlling a stairlift having a safety system.

A stairlift safety system of the present disclosure includes:
  a component adapted to send and receive an electromagnetic signal, wherein said component preferably comprises a light emitting device and a light receiving device, e.g., an LED and a photo resistor, i.e., an opto-coupler;
  an electromagnetic signal interrupter, e.g., a movable vane;
  a movable activator;
  a processor;
wherein the signal interrupter is adapted to interrupt a first electromagnetic signal via movement of the activator, wherein the activator is preferably moved by the stairlift user.

This advantageously provides a safety system that is simple in both its installation and operation.

In an embodiment of the invention, the processor is adapted to trigger an emergency stop operation or any other mechanism upon a first interruption of the first electromagnetic signal. An example of another mechanism can include, but is not limited to, a safety mechanism e.g. a folding and unfolding system.

In an embodiment of the invention, the activator is adapted to return to its original position immediately after having interrupted the first electromagnetic signal. This advantageously provides a safety system that has non-latching behavior and also allows for a second emergency stop operation to be safely and securely registered without having to reset the safety system. This is explained further in the figure description.

In an embodiment of the invention, the stairlift safety system is adapted to:
trigger a reset operation; or
maintain an emergency stop operation—which was triggered by the first interruption of the first electromagnetic signal;
upon a second interruption of the first electromagnetic signal via movement of the activator preferably after the first interruption has occurred. The reset operation preferably occurs after one or more second after the first interruption. The first emergency stop operation is preferably maintained upon a second movement of the activator after one second.

In an embodiment of the invention, the component, electromagnetic signal interrupter and activator are comprised on a printed circuit board comprising a slot, wherein the electromagnetic signal interrupter, e.g. a movable vane, is adapted to be movable within the slot. This provides a simplified safety system.

In an embodiment of the invention, the component comprises:
a device that emits electromagnetic radiation, e.g., an LED;
a device that can receive electromagnetic radiation, e.g., a photoresistor.

In an embodiment of the invention, the stairlift safety system is located in a chair of a stairlift.

In an embodiment of the invention, the stairlift safety system is located in an armrest section of a stairlift. This advantageously provides a safety system that is easily accessible by a stairlift user.

In an embodiment of the invention, a top surface of the activator is aligned with an outermost surface of the armrest. This advantageously prevents unintended use off the activator as well as permitting the safety system to fit into an armrest of the stairlift.

The invention also relates to a method of operating a stairlift comprising a stairlift safety system according to any of the previously described embodiments. The method comprises the steps of:
interrupting a first electromagnetic signal preferably via movement of the activator and movable vane;
registering a continuous electronic signal at the processor;
communicating the interruption in signals to a stairlift control unit;
triggering a response at the stairlift, wherein the response is preferably an emergency stop operation or, a reset operation.

In an embodiment of the invention, interrupting the first electromagnetic signal—preferably via moving the activator—a second time after one or more second after a first interruption, performs a reset operation.

In an embodiment of the invention, interrupting the first electromagnetic signal—via moving the activator—a second time within one second after a first interruption, maintains an emergency stop operation.

The invention also relates to the use of a stairlift safety system according to any of the previously described embodiments or according to a method according to any of the previously described embodiments, to detect a fault in a stairlift.

FIG. 1 shows a schematic representation of a safety system 1 according to an embodiment of the invention. The system 1 comprises a component 10 in the form of an opto-coupler, a signal interrupter 20, which in this particular example is a movable vane 20, an activator 30 and a PCB 40 comprising a slot 41. The opto-coupler 10 is comprised of an energy emitter 11 and receiver 12. In this particular example, the opto-coupler 10 comprises an LED 11 and a photoresistor 12. The LED is adapted to emit an electromagnetic pattern signal 13 e.g., a sine signal, a triangular signal, a pulse width modulated (PWM), or a specifically designed signal. In this particular example, the LED emits a pulse width modulated (PWM) signal 13 to the receiving photoresistor 12. In this particular example, the system 1 comprises a button. The button 1 is a spring loaded momentary button so it moves back to its original position immediately once released. Therefore, the button 1 does not have latching behavior.

The button 1 is in a "non-active" state when the vane 20 does not interrupt the signal 13. The photoresistor 12 is connected to a processor 50 which monitors an incoming signal 13, 131. The photoresistor 12 is adapted to invert the PWM signal 13 and then transmits it to a processor 50. Provided the inverted signal 13 continues to reach the photoresistor 12, the processor 50 will not trigger a command signal at a control unit 60 of the stairlift (not shown) and the stairlift continues to operate as normal.

Emergency Stop

FIG. 2 shows a schematic representation of the button 1 shown in FIG. 1 when in the "activated" state. The activator 30 has been pushed in the direction of the arrow A such that the vane 20 is now positioned between the LED 11 and the photoresistor 12. The signal 13 from the LED 11 is temporarily interrupted. The processor 50 now registers a continuous electronic signal 131 instead of the "normal" inverted signal 13. This change triggers a command signal at the control unit 60 of the stairlift to perform an emergency stop operation 70 immediately. The activated state is stored in a non-volatile memory of the processor 50.

Upon release of the activator 30, the vane 20 reverts back to its original position and restores the "non-active" state shown in FIG. 1. The signal 13 is no longer interrupted.

If the button 1 is activated a second time via movement of the activator 30 and the signal 13 is interrupted for a second time, e.g., after one or more second of the first interruption, a reset operation is initiated rather than an emergency stop command. The processor 50 is adapted to recognize this second disruption and implements a "re-set" operation to reset the emergency stop 70 status from "active" to "non-active". The processor 50 replaces the activated state already stored in the non-volatile memory of the processor 50 with a "non-active" state. This resetting action is performed as soon as the vane 20 no longer interrupts the signal 13.

If the button 1 is activated a second time via movement of the activator 30 and the signal 13 is interrupted for a second time, e.g., within one second of the first activation, the processor 50 is adapted to ignore this second activation and maintains the "active state", i.e., the emergency stop operation.

Fault Detection

The processor 50 is also adapted to continuously monitor the system 1. Under normal operating conditions and assuming a "non-active" state, the nature of the signal provided to the processor 50, e.g., an inverted PWM signal 13 or a continuous electronic signal 131, allows for failure detection to be carried out within the system 1—for example, when the transmitted signal is a continuous electronic signal 131 that lasts longer than the pattern signal time. This can be caused by e.g.:

an unintended blocking of the opto-coupler 10, e.g., the activator 30 is stuck and cannot return to its original position;

an unwanted particle or dirt has entered the opto-coupler 10;

the LED 11 is faulty.

When any one of the above scenarios occur the status of the emergency system 1 becomes "activated" and an emergency stop operation 70 is performed. If the continuous signal 131 persists, the "active" state is maintained. Once the signal 13 is restored after one or more second, a reset operation is initiated.

Another failure can relate to the type of signal being transmitted to the processor 50, e.g., the signal is neither an inverted PWM signal 13, nor a continuous electronic signal 131. This can occur when the opto-coupler 10 is no longer connected, e.g., there is a fault in the wiring, or, the LED 11 and/or the photoresistor 12 have become dislodged.

When this type of fault occurs, the status of the emergency system 1 remains at or changes to "activated".

Figure 3A:
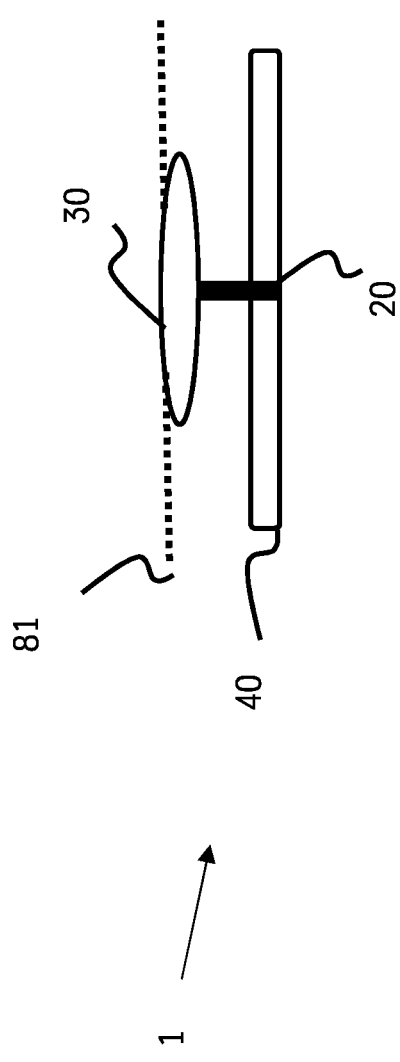
FIG. 3*a* is a schematic view of an embodiment of a safety system of the present disclosure incorporated into a housing 81 of an armrest of the stairlift.
Figure 3B:
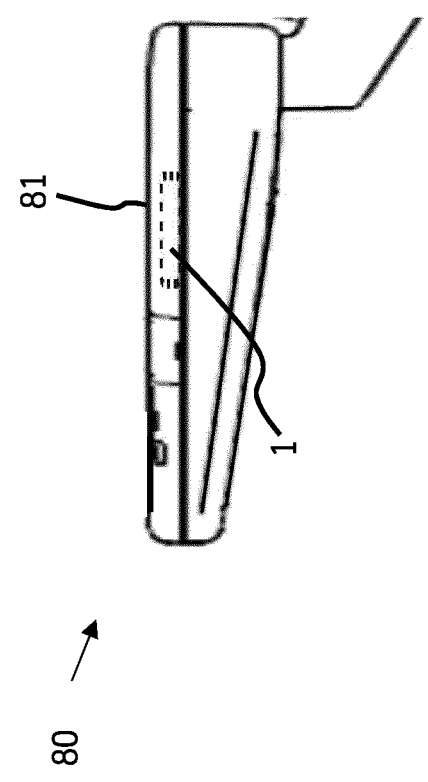
FIG. 3*b* is a schematic view of an embodiment of a safety system of the present disclosure incorporated into a housing 81 of an armrest of the stairlift.

FIGS. 3a and 3b show a schematic representation of the emergency system 1 when incorporated into a housing 81 comprised on an armrest 80 of the stairlift. Unintended use of the activator 30 is prevented by aligning the top surface of the activator 30 with the outermost surface of the housing 81 in which the activator 30 is mounted. In this way, the emergency stop button fits into the armrest 80 and its non-latching behavior provides a solution that is simplistic and safe.

It is to be understood that aspects of the various embodiments described hereinabove may be combined with aspects of other embodiments while still falling within the scope of the present disclosure. Accordingly, the foregoing description is intended to be illustrative rather than restrictive. The assembly of the present disclosure described hereinabove is defined by the claims, and all changes that fall within the meaning and range of equivalency of the claims are to be embraced within their scope.

REFERENCE SIGNS LIST 1 emergency stop system
10 optocoupler
11 LED
12 photoresistor
13 electromagnetic signal
131 continuous electronic signal
20 vane
30 activator
40 PCB
41 slot in PCB
50 processor
60 control unit
70 emergency stop
80 armrest
81 outer surface of armrest housing
A direction of force

What is claimed is:

1. A stairlift safety system, comprising:
a component configured to send an electromagnetic signal and receive the electromagnetic signal;
a movable activator configured to be moved by a user; and
an electromagnetic signal interrupter operatively coupled to said movable activator that is configured to interrupt a first electromagnetic signal sent by, and received in, said component, upon movement of said activator; and
a processor configured to recognize an interruption of the first electromagnetic signal in said component and initiate a safety action in a stairlift in response thereto,
wherein a method of operating the stairlift safety system of a stairlift including:
interrupting a first electromagnetic signal;
registering an electronic signal at the processor in response to said interrupted first electromagnetic signal;
communicating the interruption in signals to a stairlift control unit;
triggering a response in the stairlift; and
interrupting the first electromagnetic signal a second time, at least one second after the first interruption, to trigger a reset operation.

2. The stairlift safety system of claim 1, wherein for said safety action, said processor is configured to trigger an emergency stop operation in the stairlift upon a first interruption of the first electromagnetic signal.

3. The stairlift safety system of claim 2, wherein said activator is configured to return to its original position immediately after having interrupted the first electromagnetic signal.

4. The stairlift safety system of claim 2, wherein said processor is further configured to one of trigger a reset operation or maintain an emergency stop operation upon a second interruption of the first electromagnetic signal.

5. The stairlift safety system of claim 1, wherein said component, said movable activator, and said signal interrupter are operatively coupled to a printed circuit board that has a slot defined therein, wherein said signal interrupter is movable within the slot.

6. The stairlift safety system of claim 1, wherein said component comprises:
a device that emits electromagnetic radiation; and
a device that can receive electromagnetic radiation.

7. The stairlift safety system of claim 1, wherein said component, said movable activator, and said signal interrupter are disposed one of in, or on, a chair of a stairlift.

8. The stairlift safety system of claim 1, wherein said component, said movable activator, and said signal interrupter are disposed one of in, or on, an armrest section of a chair of a stairlift.

9. The stairlift safety system of claim 8, wherein a top surface of said activator is aligned with an outermost surface of said armrest.

10. The method of claim 1, further comprising:
interrupting the first electromagnetic signal a second time, within one second after the first interruption, to maintain an emergency stop operation.

* * * * *